UNITED STATES PATENT OFFICE.

ALEXANDER MITSCHERLICH, OF FREIBURG, GERMANY.

PROCESS OF MANUFACTURING GLUTINOUS SUBSTANCES.

SPECIFICATION forming part of Letters Patent No. 687,844, dated December 3, 1901.

Application filed May 13, 1897. Serial No. 636,404. (No specimens.)

*To all whom it may concern:*

Be it known that I, ALEXANDER MITSCHERLICH, professor of chemistry and doctor of philosophy, a subject of the King of Prussia, German Emperor, residing at Freiburg, in the Grand Duchy of Baden, German Empire, have invented new and useful Improvements in Processes for the Manufacture of Glutinous Substances, of which the following is a specification.

This invention has reference to a process for the manufacture of a sizing material employed in the manufacture of paper, and it differs from the process heretofore practiced by so combining the action of the well-known animal and vegetable sizing as to avoid the difficulties accompanying the use of these agents.

A great inconvenience in the employment of rosin sizing as heretofore used for sizing the paper in the beater was its quality of becoming easily decomposed and wholly or partially precipitated if hard water was used in working the pulp in the beater-engine, the precipitated sizing causing specks and dirty appearance of the paper in the manufacture of which such water was used and greatly interfering with its employment as a writing-paper and for other purposes. This difficulty is avoided in my invention by effecting a combination of the usual engine-sizing with an animal sizing by means of the spent liquor from the manufacture of sulfite pulp, which liquid, being rich in tannin and containing dextrine-like glutinous substances, not only improves the properties of the size produced with it, but also in effecting a combination of the rosin with the glue or other animal sizing related thereto causes the formation of a new product under certain conditions which will not be affected by water of even exceptional hardness and which will uniformly combine with the fiber and entirely obviate the formation of specks, while at the same time it imparts to the paper a greater degree of resistance against water, so that the paper manufactured with the sizing obtained by my improved process will not imbibe and spread the ink so readily, and will therefore be particularly suited to be employed as a writing-paper. This action is probably due to a chemical combination of the resinous and animal substances with the tannin and other constituents of the said spent sulfite liquor, the new product resulting therefrom differing in its properties both from the sizing employed heretofore as well as from the product obtained by treating each of the constituent sizing materials separately with the said spent liquor.

In carrying my invention into effect I prefer to proceed as follows, though it is understood that I may vary the method of procedure somewhat to suit existing conditions without, however, departing from the spirit of my invention, as hereinafter pointed out in the claims.

In order to prepare the animal sizing material so as to make it ready for its combination with the rosin and the other constituents of my improved sizing, I prefer to treat these materials—such as horn pith, hoofs, glue, hair, or other material rich in ceratin—with the spent sulfite liquor, which has previously been rendered alkaline by the addition of lime, soda, or other substances possessing an alkaline reaction. The addition of these alkaline substances to the said spent liquor will of course cause a precipitate consisting chiefly of the carbonates and most of the sulfites which were present in the solution. These may be removed from the liquor by suitable means, and to the tolerably clear liquid thus obtained I then add burnt lime or caustic soda in order to change the carbonates which the purified liquid still contains into hydrates. I then allow to settle, draw off the liquid from the deposit, and use the liquid thus obtained for the treatment of the above-mentioned animal matter, such as horn pith and the like material, at a temperature of about 200° Fahrenheit, at which temperature a practical solution of the said animal matter in the said liquid will be effected. The precipitate resulting in this process of solution may then be used for neutralizing other portions of spent liquor. For some purposes I have found it expedient to prepare the alkaline liquid for effecting the preliminary solution of the horny matters by simply imparting the necessary alkalinity to water and treating the substances therewith at a temperature below 212° Fahrenheit. I may also effect a solution of the horny material for all practical purposes by treating the same at a temperature above 212° Fahrenheit with water alone.

In order to obtain the animal matter used in my process in a perfectly pure state, I may precipitate the solution obtained in the manner heretofore described by adding fresh portions of spent sulfite liquor to the alkaline solution of the horny matter, whereby the latter is precipitated in a pure state and may be redissolved in an alkaline solvent. It is obvious that by increasing the alkalinity of the solvent or the density of the liquid or the duration of the treatment I am enabled to dissolve any desired quantity of horny material in the liquor.

When making use of spent sulfite liquor as a ready solvent for the horny or other animal sizing material, it is essential in carrying out my improved process to first remove the impurities, chiefly inorganic, from the liquor, which is effected in the manner above described by the precipitation of such impurities, carbonates, silicates of lime and magnesia, and other impurities by the addition of alkaline substances. As regards the quantities to be used in this preliminary treatment, I have found it convenient to use about twenty-six pounds of soda-ash or the equivalent amount of carbonate of potash per one hundred (100) liters for a sulfite liquor of about 1.04 specific gravity, which quantity may be increased or diminished in proportion to the change in the density of the said liquor. The clear liquor drawn off from the precipitate is then causticized by the addition of about ten pounds of burnt lime, the degree of causticity being tested at suitable intervals in the well-known manner. In order to carry on the solution of the horny and other animal matter in the alkaline liquid continuously on a large scale, I may use lead or cement lined digesters; but for most practical purposes I prefer to use a series of tanks arranged one above the other in steps and filled with pieces of convenient size of the horny or other animal matter and through which the practically clear solution of the solvent is passed. The resulting solution may then be clarified by settling or in any other suitable manner. Each of the tanks is preferably provided with a false perforated bottom to allow the liquid to percolate through without the danger of stopping up the pipes for the communication of the liquid. The tanks may of course be fitted with a jacket, or in the case of wooden tanks with heating-coils, so as to raise the temperature of the solvent. The solution of the horny or other animal matter, prepared with any of the above-mentioned solvents and which has an alkaline reaction, is then used as a means for dissolving and combining with the resinous sizing material. In the case the solution of horny material has been effected without the use of spent liquor from the manufacture of paper-pulp—as, for instance, by the treatment of such substances with water at a temperature above 212° Fahrenheit—it is necessary to make an addition of such spent liquor from which the impurities have been previously removed in the manner above described.

For effecting the solution of the resinous matter, preferably rosin, in the mixture of the purified sulfite pulp liquor with the solution of the horny or other animal sizing material I may proceed as follows: The total amount of the resin which is intended for solution is first melted and then allowed to run into the said alkaline liquid, of which small quantities will already suffice to dissolve comparatively large quantities of resin at a temperature which need not be raised above 212° Fahrenheit. The impurities and any undissolved matter will remain floating on top of the liquid and may be removed in any suitable manner. I then add to the liquid, which now contains both the animal and the resinous sizing material in solution, another quantity of the hot and previously-purified spent sulfite liquor while keeping the liquid stirred up all the time. If the liquid still contains some carbonic acid, the solution of the resin will cause strong frothing; otherwise but a very feeble frothing will occur. It is obvious that I may vary the quantities of the resinous matter which I incorporate with the liquid by changing the alkalinity or by varying the quantities of each of the constituents used in effecting this solution. Instead of using, for instance, a larger quantity of solvent with a lower degree of alkalinity I may use a lesser quantity of the concentrated liquid, or I may also first prepare a solution of the rosin or other resinous material in the spent sulfite liquor from the manufacture of paper-pulp, which has, however, been previously freed from the impurities, carbonates, silicates, sulfites, sulfates, and the like, and has been rendered alkaline by the treatment with alkaline agents in the manner above described, and then add this solution of the resinous matter to the solution of horny and other animal sizing material prepared by any of the modifications of my process above described.

The usual solution of rosin soap, employed heretofore in paper-mills as a sizing, I have found to be unserviceable for the purposes of my invention, which proves that the presence of some of the organic constituents of the sulfite liquor from the manufacture of paper-pulp is one of the most essential features of my invention, on which the success of my process depends.

I have found that the two sizing materials are for most purposes preferably combined in the proportions of about three parts, by weight, of rosin to one of horny material or of other animal sizing material, which proportions may of course be varied to suit existing conditions.

The finished product which has been prepared by the process above outlined constitutes a clear viscous liquid, from which, even on prolonged keeping, no deposit will separate. It is readily soluble in hot water and can be used as a combined engine and machine sizing directly in the beater in the usual manner. This product possesses superior binding and adhesive properties, and a comparatively small quantity of it will be sufficient to counteract the blotting action of the paper. It presents the further important advantage that much less of alum or other precipitant is used to make it combine with the fiber in the beater than was necessary with the rosin soap which was heretofore used as an engine-sizing, the economy in alum having been found to amount to nearly sixty per cent.

What I claim, and desire to secure by Letters Patent of the United States, is—

1. The process for the manufacture of a paper-sizing material by first removing the impurities from the spent sulfite liquor obtained in the manufacture of cellulose rendering the liquor alkaline and incorporating therewith animal sizing material and resinous substances.

2. The process for the manufacture of paper-sizing, comprising the addition of lime, soda or other alkaline agents to the spent sulfite liquor resulting in the manufacture of cellulose, drawing off the clear liquid from the deposit obtained and dissolving therein horny or other animal sizing material and resinous substances, substantially as described.

3. The process for the manufacture of paper-sizing, comprising the use of spent sulfite liquor resulting from the treatment of wood in the manufacture of cellulose purifying said liquor by the addition of carbonates, removing the liquid from the deposit obtained and causticizing said liquid in any suitable manner and then combining it with horny matters or other animal sizing and with rosin or other resinous substances, substantially as described.

4. The process for the manufacture of paper-sizing comprising the treatment with alkaline agents of spent sulfite liquor resulting from the manufacture of cellulose, separating the resulting liquid from the deposit dissolving resinous matter therein and then incorporating and dissolving horny material in the solution substantially as described.

5. The process for the manufacture of a paper-sizing material comprising the solution of animal sizing material horn and the like by suitable solvents, purifying the solution obtained by reprecipitating with spent sulfite liquor and redissolving in an alkaline agent, and then incorporating and dissolving therein resinous substances substantially as described.

6. As a new article of manufacture a paper-sizing material consisting of horny and resinous substances combined and the active constituents of the liquid remaining after the treatment with alkali of the spent sulfite liquor from the manufacture of paper-pulp substantially as described.

In testimony whereof I have signed my name to this specification in the presence of two subscribing witnesses.

ALEXANDER MITSCHERLICH.

Witnesses:
OTTO HERING,
G. HÜLSMANN.